(12) United States Patent
Gerke

(10) Patent No.: US 10,864,536 B2
(45) Date of Patent: Dec. 15, 2020

(54) METERING AND APPLICATION SYSTEM FOR A MOISTURE-CURING POLYMER MATERIAL

(71) Applicant: Wagner International AG, Altstatten (CH)

(72) Inventor: Thomas Gerke, Haiger (DE)

(73) Assignee: Wagner International AG, Altstatten (CH)

( * ) Notice: Subject to any disclaimer, the term of this patent is extended or adjusted under 35 U.S.C. 154(b) by 232 days.

(21) Appl. No.: 16/117,419

(22) Filed: Aug. 30, 2018

(65) Prior Publication Data

US 2019/0060925 A1  Feb. 28, 2019

(30) Foreign Application Priority Data

Aug. 30, 2017 (EP) .................................. 17020394

(51) Int. Cl.
  *B05B 7/00* (2006.01)
  *B01F 3/04* (2006.01)
  (Continued)

(52) U.S. Cl.
  CPC .............. *B05B 7/0018* (2013.01); *B01F 3/04* (2013.01); *B01F 5/04* (2013.01); *B05B 7/267* (2013.01); *B05B 15/20* (2018.02); *B05C 11/1015* (2013.01); *B29C 44/3442* (2013.01); *B29C 44/3446* (2013.01); *B05B 7/0031* (2013.01); *B05C 5/02* (2013.01); *B29B 7/7414* (2013.01); *B29B 7/7419* (2013.01); *B29B 7/7423* (2013.01); *B29C 44/36* (2013.01)

(58) Field of Classification Search
  CPC ............. B01F 3/04; B01F 5/04; B05B 7/0018
  See application file for complete search history.

(56) References Cited

U.S. PATENT DOCUMENTS 4,778,631 A   10/1988  Cobbs, Jr. et al.
5,207,352 A    5/1993  Porter et al.
         (Continued)

FOREIGN PATENT DOCUMENTS

EP     0 091 699 A2   10/1983
EP     1 240 931 A1    9/2002
         (Continued)

OTHER PUBLICATIONS

Extended European Search Report for corresponding European Application No. 17020394.7 dated Feb. 23, 2018.

*Primary Examiner* — Robert A Hopkins
(74) *Attorney, Agent, or Firm* — Renner, Otto, Boisselle & Sklar, LLP

(57) ABSTRACT

A metering and application system for a moisture-curing polymer material includes a reservoir for the polymer material and a first pump and a second pump, wherein the polymer material is conveyable by the first pump from the reservoir to the second pump. In addition, a gas metering device with a defined pressure ratio is provided to bring a gas to a defined pressure, wherein the gas metering device is connected to the input of the second pump on its outlet side. In addition, a mixer for mixing the polymer material and the gas and a valve arranged downstream of the mixer for metering and a nozzle for applying the polymer material/gas mixture are provided.

17 Claims, 6 Drawing Sheets

(51) Int. Cl.
    *B01F 5/04*     (2006.01)
    *B05B 15/20*     (2018.01)
    *B05C 11/10*     (2006.01)
    *B05B 7/26*     (2006.01)
    *B29C 44/34*     (2006.01)
    *B29B 7/74*     (2006.01)
    *B05C 5/02*     (2006.01)
    *B29C 44/36*     (2006.01)

(56) References Cited

U.S. PATENT DOCUMENTS

| | | | |
|---|---|---|---|
| 5,382,397 A | 1/1995 | Turner, Jr. | |
| 7,703,705 B2 * | 4/2010 | Ganzer | B29C 44/3446 118/30 |
| 2007/0051832 A1 | 3/2007 | Jones et al. | |

FOREIGN PATENT DOCUMENTS

| | | |
|---|---|---|
| EP | 2 017 013 B1 | 3/2013 |
| GB | 2 215 643 A | 9/1989 |
| WO | 2016/125900 A1 | 8/2016 |

* cited by examiner

METERING AND APPLICATION SYSTEM FOR A MOISTURE-CURING POLYMER MATERIAL

CROSS-REFERENCE TO RELATED APPLICATIONS

This application claims priority under 35 USC § 119 to European Patent Application No. 17 020 394.7, filed on Aug. 30, 2017, the entire disclosure of which is incorporated herein by reference.

TECHNICAL FIELD

The invention relates to a metering and application system for a moisture-curing polymer material.

The metering and application system according to the invention can be used for metering and applying, for example, 1K foam. 1K foam (one-component foam) is a predominantly closed-pore polymer material which serves as a sealing material, among other things. 1K foam is used to seal vehicle headlights, for example. For this purpose, a bead of 1K foam is applied to the vehicle body and then the headlight is pressed on the bead. 1K foam is thixotropic, so it is—unlike 2K foam—foamed immediately after it has exited the nozzle. Therefore, 1K foam can also be applied upside down (3D) without dripping.

2K foam (two-component foam) is made up of two components and, after it has exited from the application nozzle, is more fluid than 1K foam. 2K foam reacts only after leaving the nozzle with gas (air or nitrogen), which serves as a crystallization seed. If 2K foam is applied to an inclined surface, it will run off before it is sufficiently stabilized by curing.

In the automotive industry, if possible, 1K foams are preferred over 2K foams since errors may occur when mixing the components required to produce the 2K foam.

In principal, no humidity should get into the system, because otherwise the material to be applied could already react in the system with the air or with water molecules in the air, and cure.

BACKGROUND ART

EP 2 017 013 B1 discloses a slot coating gun for extruding a foamable melted material in a wide band application. For the production of the foamable melted material, a material source, a first gear pump, a second gear pump and a gas supply are provided. The first pump conveys the melted material from the material source to the second pump via a connecting line (hereinafter also referred to as a pump connecting line) wherein the second pump conveys more material than the first pump. This creates a negative pressure in the pump connecting line which is used to introduce gas into the melted material. Subsequently, the gas enriched melted material is mixed in a mixer and fed to the slot coating gun. In this solution, the connecting line between the two pumps must be very short. The first pump can therefore not be arranged in the immediate vicinity of the material source. Otherwise, because of the long pump connecting line and the high viscosity of the melted material in the connecting line, a pressure drop would occur, which results in less or even no gas being drawn into the connecting line. In addition, it is difficult in this solution to keep the mixing ratio of gas to melted material permanently constant. A fluctuating mixing ratio leads to quality losses. In the solution according to the conventional art, it is mandatory that the first pump be embodied as a gear pump, so that the highly viscous melted material can be conveyed from the material source not only over a short line, but also over a line that is several meters long. Another disadvantage is that also the second pump is to be embodied as a gear pump in order to be able to generate the necessary negative pressure in the pump connecting line, and in order to be able to compensate for the pressure loss in the connecting line caused by the highly viscous material. In addition, the two gear pumps are heavy and expensive. Since the material in the pump connecting line is enriched with gas, the entire connecting line must be cleaned before the system is shut down. Otherwise, the material may react with the gas in the connecting line and clog the connecting line.

SUMMARY OF THE INVENTION

An object of the invention is to provide a metering and application system for a moisture-curing polymer material, wherein gas can be introduced into the polymer material as uniformly as possible.

Advantageously, the metering and application system according to the invention is lighter than that from the conventional art.

The object is achieved by a metering and application system for a moisture-curing polymer material as claimed herein.

The metering and application system according to the invention for a moisture-curing polymer material includes a reservoir for the polymer material and a first pump and a second pump, wherein the polymer material is conveyable by the first pump from the reservoir to the second pump. In addition, a gas metering device with a defined pressure ratio is provided to bring a gas to a defined pressure, wherein the gas metering device is connected to the input of the second pump on its outlet side. In addition, a mixer for mixing the polymer material and the gas and a valve arranged downstream of the mixer for metering and a nozzle for applying the polymer material/gas mixture are provided.

Advantageous developments of the invention will become apparent from the features described herein.

In one embodiment of the metering and application system according to the invention, the mixer is embodied as a static mixer or as a dynamic mixer or as a combination of a static and a dynamic mixer.

In a further embodiment of the metering and application system according to the invention, the gas metering device has a first chamber with a defined volume and a pressure piston, wherein the pressure piston in the first chamber performs a defined stroke. In addition, the gas metering device has a second chamber and a piston coupled with the pressure piston, with which the gas in the second chamber can be set to the defined pressure.

In another embodiment of the metering and application system according to the invention, the gas metering device has a position sensor for detecting the stroke of the pressure piston. If the pressure piston repeatedly carries out constant strokes, it is ensured that repeatedly large volumes of gas are expelled from the second chamber. The position sensor can also be used to monitor the two end positions of the pressure piston. When the pressure piston reaches one and the other end position, it is ensured that all gas is expelled. If required, the condition of the pressure piston seal can also be checked with the position sensor. For this purpose, for example, the time course of the pressure piston stroke (path-time diagram of the pressure piston) can be evaluated. If it is determined by the controller that the chronological course of the piston stroke does not correspond to the desired course, the controller can issue an alarm.

In an additional embodiment of the metering and application system according to the invention, a first check valve is arranged at the gas inlet of the second chamber and a second check valve is arranged at the gas outlet of the gas metering device.

In the metering and application system according to the invention, it can be provided that the gas metering device has a third check valve which is arranged in the flow path of the gas between the first check valve and the second check valve.

In addition, it can be provided in the metering and application system that a first pressure sensor is arranged before the second pump in order to detect the pressure in the supply line to the second pump.

Advantageously, in the metering and application system according to the invention, a second pressure sensor is provided at the outlet of the second pump in order to detect the pressure at the outlet of the second pump. The second pressure sensor can be used to monitor the operating state of the second pump. For example, if the controller detects an incident, it can shut down the system and protect the pump from overloading.

In a development of the metering and application system according to the invention, the gas metering device has a pressure sensor in order to detect the pressure in the second chamber.

In another development of the metering and application system according to the invention, a pressure sensor is provided at the inlet of the mixer to detect the pressure at the inlet of the mixer.

In an additional development of the metering and application system according to the invention, a third pump is provided at the outlet of the mixer in order to specify the amount of polymer material output.

According to a further feature of the invention, a pressure sensor is provided in the metering and application system at the outlet of the third pump to detect the pressure at its outlet. The second pressure sensor can be used to monitor the operating state of the third pump.

Moreover, in the metering and application system according to the invention it can be provided that the first pump is embodied and operable to keep the pressure at its outlet constant, and the second pump is embodied and operable to keep the pressure at its outlet constant.

In addition, an accelerator material pump for accelerator material and an additional pump (metering pump) may be provided in the metering and application system according to the invention, wherein the accelerator material pump serves to convey accelerator material to the additional pump. The additional pump is provided to pump the accelerator material to a second mixer, wherein the second mixer is provided to mix the gas/polymer material mixture with the accelerator material. The additional pump can be a metering pump.

In one embodiment of the metering and application system according to the invention, a pressure sensor is provided on the inlet side of the additional pump.

In a further embodiment of the metering and application system according to the invention, a pressure sensor is provided at the outlet of the additional pump in order to detect the pressure at its outlet. The pressure sensor can be used to monitor the operating state of the additional pump.

Finally, the metering and application system according to the invention can have a robot which carries the nozzle for applying the polymer material/gas mixture.

BRIEF DESCRIPTION OF THE DRAWINGS

Below, the invention will be explained in more detail by several exemplary embodiments with reference to nine figures.

DETAILED DESCRIPTION

Figure 1:
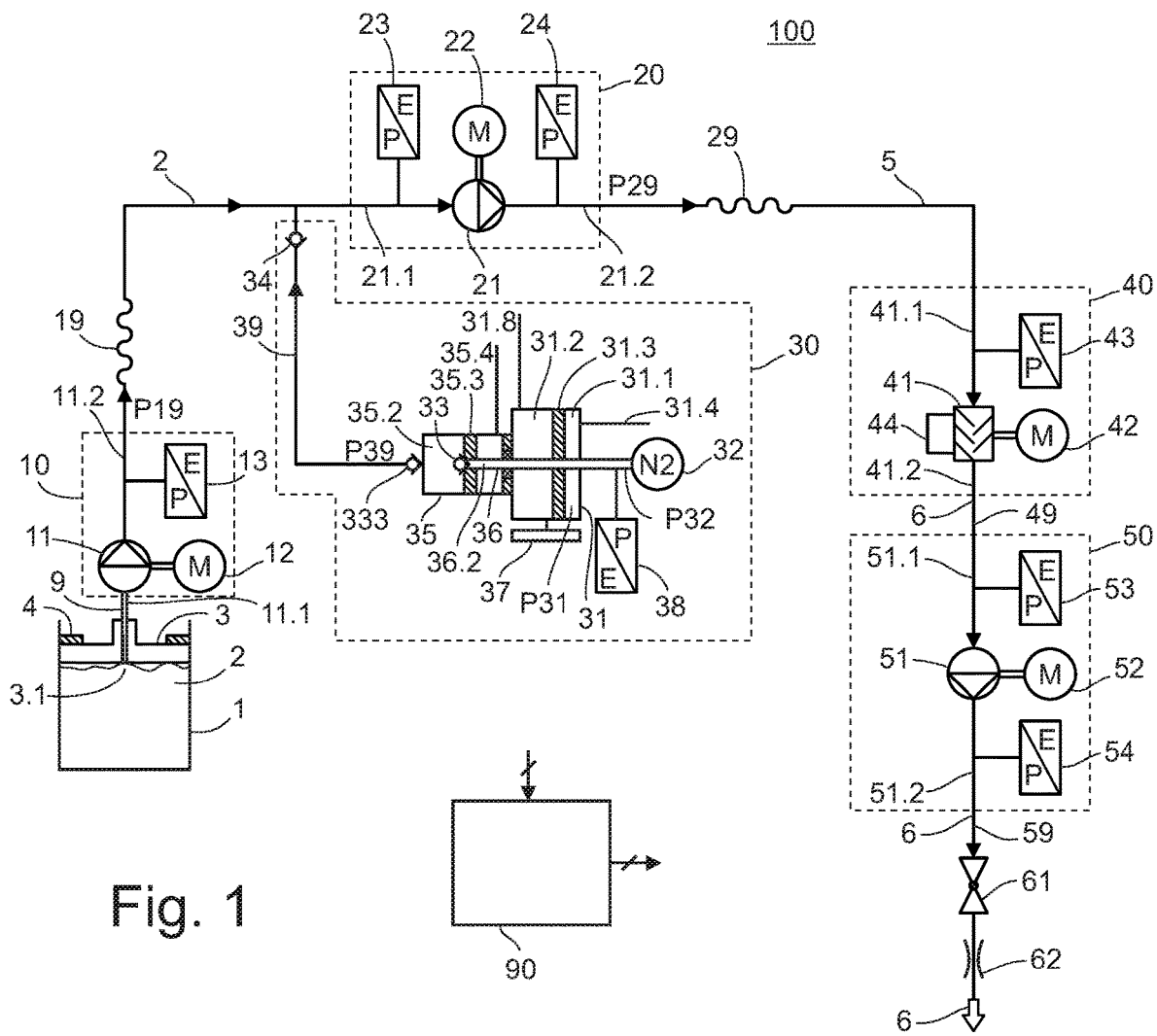
FIG. 1 shows a block diagram of a first possible embodiment of the metering and application system according to the invention.

The structure of a first possible embodiment of the metering and application system 100 for a moisture-curing polymer material 2 is explained in more detail below. The metering and application system 100 is shown in FIG. 1 in the form of a block diagram. Hereinafter, moisture will be understood to be a fluid dissolved in a gas, wherein the fluid may be, for example, water, and the gas may be air or nitrogen.

The moisture-curing polymer material 2, which can be metered and applied with the metering and application system 100, is a one-component material. It has a medium to high viscosity and is used, for example, as a sealant or adhesive. The moisture-curing polymer material 2, which hereinafter is also referred to in short as the polymer material, is usually provided by the manufacturer in a reservoir 1 or, in short, container, for example a bucket or a drum.

A follower plate 3 can be introduced from above into the container 1 with the polymer material 2 to be conveyed, and the polymer material 2 can then be conveyed through the follower plate 3 by means of a first pump 11.

The follower plate 3 is preferably equipped with a ring-shaped seal so that the follower plate 3 can abut against the wall of the container 1 in a sealing manner. The seal ensures that no material escapes between the follower plate 3 and the container wall. The follower plate 3 has a pressure-effective surface, which advantageously is embodied obliquely at least in part. As a result, the pressure on the material 2 to be conveyed can be partially increased and it can be ensured that the polymer material flows increasingly toward the discharge port 3.1 of the follower plate 3. The Pump 11 can convey the polymer material 2 out of the container 1 through the discharge port 3.1.

The pump 11 is driven by a drive 12 and a drive rod. When the pump 11 is embodied as a scoop piston pump, the drive 12 is configured in such a way that it causes the drive rod to perform a lifting movement, which is transmitted to the scoop piston pump.

The scoop piston pump has a scoop piston with a scoop piston plate arranged at its lower end. In order to convey material 2 out of the container 1, the scoop piston is moved downwards so that the scoop piston plate dips into the material and takes up material 2. In the upward movement of the scoop piston, the scoop piston plate carries the material 2 along and into the interior of the pump. From there, it passes via a first check valve into a first pump chamber. During the next downward movement of the drive rod and the scoop piston connected to it, the material 2 passes through a second check valve into a second pump chamber. With the subsequent upward movement of the scoop piston, the material 2 is transported out of the pump 11 into a material supply line 19. In this way, material 2 is transported into the material feed line 19 with each upward stroke of the scoop piston.

Instead, the pump 11 may also be a piston pump without scoop piston. In the case of highly viscous materials the scoop piston has the advantage that the material is scooped directly to the pump inlet 11.1. Thus, the suction of the pump can be improved. On the other hand, if the pump 11 is embodied as a gear pump, a spindle pump or an eccentric screw pump, the drive 12 is configured to cause the drive rod to execute a rotational movement which is transferred to the gear pump, the spindle pump or the eccentric screw pump.

On the outlet side, i.e. in the vicinity of the outlet 11.2 of the first pump 11, a pressure sensor 13 may be provided to measure the pressure in the line 19. The first pump 11, the pump drive 12 and the pressure sensor 13 may be combined to form a pump assembly 10.

The material supply line 19 may be embodied as a hose and may be between 3 m and 20 m long. It connects the first pump assembly 10 to a second pump assembly 20.

The second pump assembly 20 comprises a second pump 21 and a pump drive 22 for driving the second pump 21. This second pump 21 is preferably embodied as a gear pump. A pressure sensor 23 may be arranged on the inlet side 21.1 of the second pump to detect the pressure prevailing on the inlet side 21.1 in the line 19.

On the outlet side 21.2 of the second pump 21, a further pressure sensor 24 may be arranged to detect the pressure prevailing on the outlet side 21.2 in the line 29.

Figure 3:
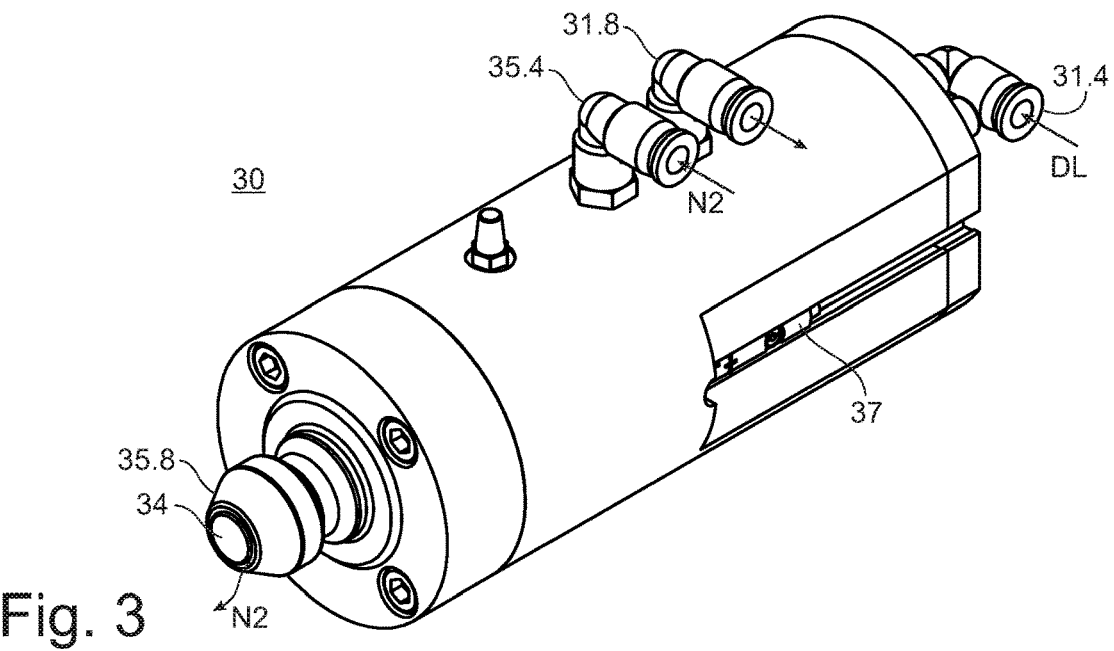
FIG. 3 shows a gas metering device which can be utilized in the metering and application system according to the invention.
Figure 4:
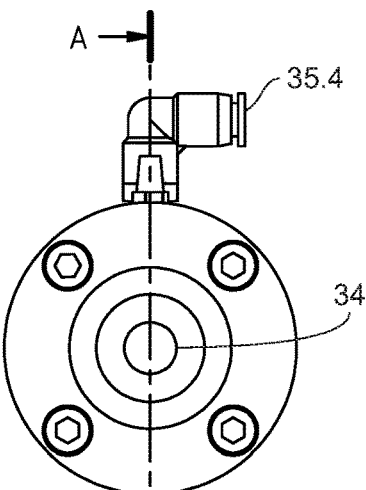
FIG. 4 shows the gas metering device in front view.
Figure 5:
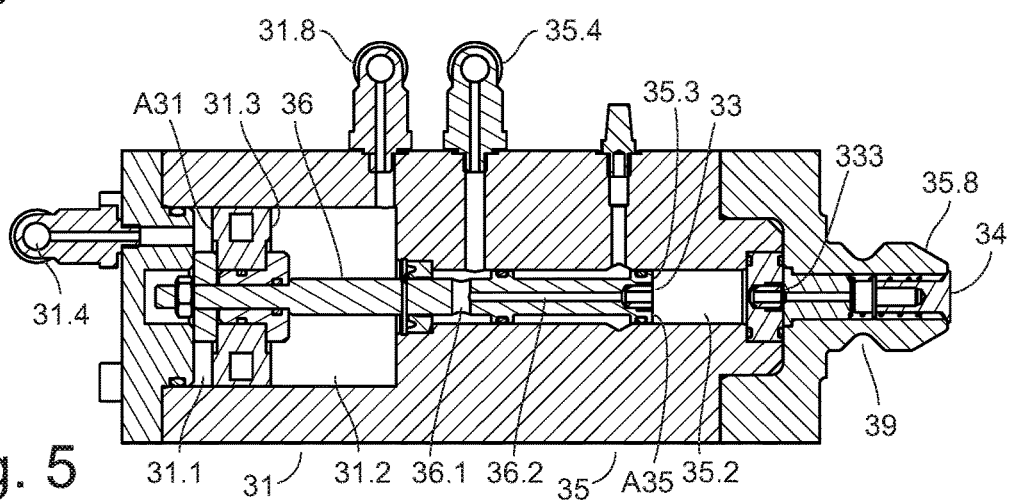
FIG. 5 shows the gas metering device in longitudinal section.

The metering and application system 100 also comprises a gas metering device 30, which can be constructed as shown in FIGS. 3, 4 and 5. The gas metering device 30 is equipped with a first cylinder 31 and a second cylinder 35, wherein the first cylinder 31 and the second cylinder 35 form a lifting transformer with a defined pressure ratio. For this purpose, a first chamber 31.2 and a pressure piston 31.3 are located in the first cylinder 31 and a second chamber 35.2 and a piston 35.3 in the second cylinder 35. The two pressure pistons 31.3 and 35.3 are coupled with each other via a piston rod 36. The pressure piston 31.3, the piston 35.3 and the piston rod 36 can also be made as a single-piece component.

The gas metering device 30 is constructed and operable in such a way that the pressure piston 31.3 in the first chamber 31.2 performs a defined stroke. As a result, with the piston 35.3 in the second chamber 35.2, the gas located therein is brought to a defined pressure P39. The gas introduced into the second chamber 35.2 can be, for example, air or nitrogen and originates from a corresponding gas source 32. As shown in FIG. 5, the gas can be passed into the second chamber 35.2 via a gas inlet 35.4. For this purpose, the piston rod 36 is equipped with a transverse bore 36.1 and a duct 36.2. Thus, the gas reaches the chamber 35.2 by passing through the gas inlet 35.4, the transverse bore 36.1 and the duct 36.2. When the piston rod 36 is moved to the right from the left end position shown in FIG. 5, the volume in the chamber 35.2 decreases accordingly and the gas therein is compressed.

The gas metering device 30 advantageously has a first check valve at the inlet of the chamber 35.2, which prevents the gas in the chamber 35.2 from flowing back to the gas source 32 when the piston 35.3 pressurizes the gas in the chamber 35.2.

At its outlet 35.8 the gas metering device 30 has also advantageously a second check valve 34. By means of the second check valve 34 gas from the line 39 is prevented from flowing back into the chamber 35.2, when the piston 35.3 moves back, i.e. the volume of the chamber 35.2 increases again. When the pressure P39 is high enough, the gas flows from the second chamber 35.2 through the check valve 34 in the line 39 and from there to the second pump 21. Since the pressure P39 is significantly higher than the pressure P19, the gas is pushed into the polymer material 2 located at the inlet 21.1 of the second pump 21. Subsequently, the gas/polymer material mixture is homogenized by means of a mixer 41.

The gas metering device can advantageously have a third check valve 333, which is arranged directly at the outlet of the chamber 35.2. In terms of flow technology, the third check valve 333 is located in the gas flow path between the first check valve 33 and the second check valve 34. The second check valve 34 may be larger than the third check valve 333. The check valve 34 prevents the ingress of polymer material into the check valve 333. By means of the third check valve 333, the dead space can be minimized. Dead space is the space in the outlet area 35.8 of the gas metering device 30 which can not be reached by the piston 35.3.

The gas metering device 30 which works with a pressure ratio has the advantage that at the gas source 32 a gas pressure of a few bar, for example from 2 to 3 bar, is sufficient to push the gas into the polymer located at the inlet 21.1 of the second pump 21.

In one possible embodiment, the pressure P19=10 bar and the pressure P39=60 bar. In this example, the pressure ratio $V_P$ is:

$$V_P = P39/P31 = A31/A35 = 6$$

Wherein:
A31 is the pressure-effective area of the pressure piston 31.3 and
A35 is the pressure-effective area of the piston 35.3.

On the outlet side, the gas metering device 30 is connected to the inlet 21.1 of the second pump 21 via the line 39. It is advantageous to keep the line 39 short. The shorter the line 39, the smaller the dead space and the shorter the reaction time.

On the inlet side of the gas metering device 30, a pressure sensor 38 may be arranged to detect the gas pressure P32 prevailing in the duct 36.2. The gas pressure 32 prevailing in duct 36.2 can be used to check the operability of the valve 33. If, with the valve 33 open, a pressure drop in the duct 36.2 can be detected, the gas flows from the gas source 32 through the valve 33, that is to say the valve 33 conveys gas into the chamber 35.2 and operates properly. If, after the valve 33 has been opened, no (at least short-term) pressure drop can be detected in the duct 36.2, the controller 90 can conclude that no gas flows through the valve 33 into the chamber 35.2. The valve 33 thus does not convey any gas and there is a malfunction.

The second pump 21 ensures that the gas dissolved in the polymer material 2, hereinafter referred to as polymer material/gas mixture 5, is fed into a mixer 41. For this purpose, the outlet 21.2 of the second pump 21 is connected to the mixer 41 via a line 29, which may be embodied, for example, as a hose. By means of the mixer 41, the polymer material/gas mixture 5 is mixed and thus homogenized. The line 29 can be between 0 m and 5 m long. When restarting the system after a prolonged downtime, it is advantageous to rinse the line 29 in order to flush out the polymer material/gas mixture 5 still contained therein. The shorter the line 29, the lower the loss of material due to the flushing of the line 29.

In the metering and application system 100 shown in FIG. 1, the mixer 41 is embodied as a dynamic mixer. The dynamic mixer 41 includes one or more movable mixing elements which are driven via a mixer drive 42 and provide for the mixing of the gas and the polymer material.

If the mixer 41 is embodied as a dynamic mixer, it may be helpful to provide a cooler 44 for cooling the gas/polymer material mixture. By means of the cooler 44 it is achieved that the gas/polymer material mixture does not become too hot due to the shearing movements occurring during the mixing process in the material. Thus, a certain, desired viscosity of the gas/polymer material mixture can be set.

Instead, the mixer 41 may also be embodied as a static mixer. Unlike in the case of the dynamic mixer, no moving components are installed in the static mixer, rather rigid, flow-influencing elements are arranged in a pipe. These divide the material flow and then bring it together again, whereby the mixing is achieved. In the static mixer, the mixing of the gas and the polymer material is done solely by the flow movement of the two fluids.

Both in the dynamic and in the static mixer, a homogeneous polymer material/gas mixture 6 is available at the outlet 41.2.

A pressure sensor 43 may be provided at the inlet 41.1 of the mixer 41 to detect the pressure at the mixer inlet 41.1.

The homogeneous polymer material/gas mixture 6 produced by the mixer 41 is fed to a third pump 51 via a line 49. The third pump 51 conveys the homogeneous polymer material/gas mixture 6 to a metering valve 61 via a line 59, which hereinafter will also be referred to in short as a valve. The metering valve 61 is followed by a nozzle 62, also called an application nozzle, by means of which the homogeneous polymer material/gas mixture 6 can be applied.

Preferably, the two lines 49 and 59 are short so that when shutting down or at a longer downtime of the system 100 only as little as possible of the polymer material/gas mixture 6 must be disposed of.

The readings determined by the position sensor 37 and by the pressure sensors 13, 23, 24, 38, 43, 53 and 54 are fed to a controller 90, which evaluates and processes the readings.

By means of the position sensor 37, the position of the piston 31.3 can be detected. From its temporal position, the controller 90 can produce a time/distance diagram. By means of the time/distance diagram conclusions regarding the operability of the valves 333 and 34 can be drawn. For example, if the controller 90 determines that the time course of the piston stroke does not match the target course, the controller 90 may issue an alarm.

For example, the controller 90 may be embodied and operable to be able to control the drives 12, 22, 42, and 52 with it. The controller 90 may form a control loop together with the pump 11, the drive 12 and the pressure sensor 13. The same applies mutatis mutandis to the pumps 21 and 51, the pump drives 22 and 52 and the pressure sensors 23, 24, 53 and 54. Thus, for example, the first pump 11 can be controlled in such a way that at its outlet 11.2 it provides a polymer material flow 2 with a constant pressure P19. By means of the controller 90, the second pump 21 can also be controlled so that it provides at its outlet 21.2 a gas/polymer material stream 5 with a constant pressure P29. The controller 90 may also form a control loop with the gas metering device 30.

The metering valve 61 can also be controlled by means of the controller 90. The controller 90 may specify when and for how long the metering valve 61 is open.

In addition, the controller 90 may be provided to control the gas metering device 30. The controller 90 may provide for the gas metering device 30 at certain times, for example, with a frequency $F_{30}$ of 1 or 2 Hz, to push gas into the line 19 via line 39. The frequency $F_{30}$ with which the gas metering device 30 pushes gas into the line 19 preferably depends on the rotational speed of the pump 21. The controller 90 may also have a control valve which is connected to the compressed air port 31.4 of the cylinder 31 and via which the chamber 31.2 of the cylinder 31 can be pressurized with compressed air.

The controller 90 may also evaluate the readings from the pressure sensors 13, 23, 24, 38, 43, 53 and 54 for safety purposes. For example, it may be provided that as soon as the reading of the pressure sensor 13 exceeds a certain upper safety threshold, the controller 90 intervenes and shuts down the system 100 or issues an alert message. The operating personnel can then act as required by the current situation. In a similar way, the controller 90 can handle the readings coming from the other pressure sensors 23, 24, 38, 43, 53 and 54.

Figure 2:
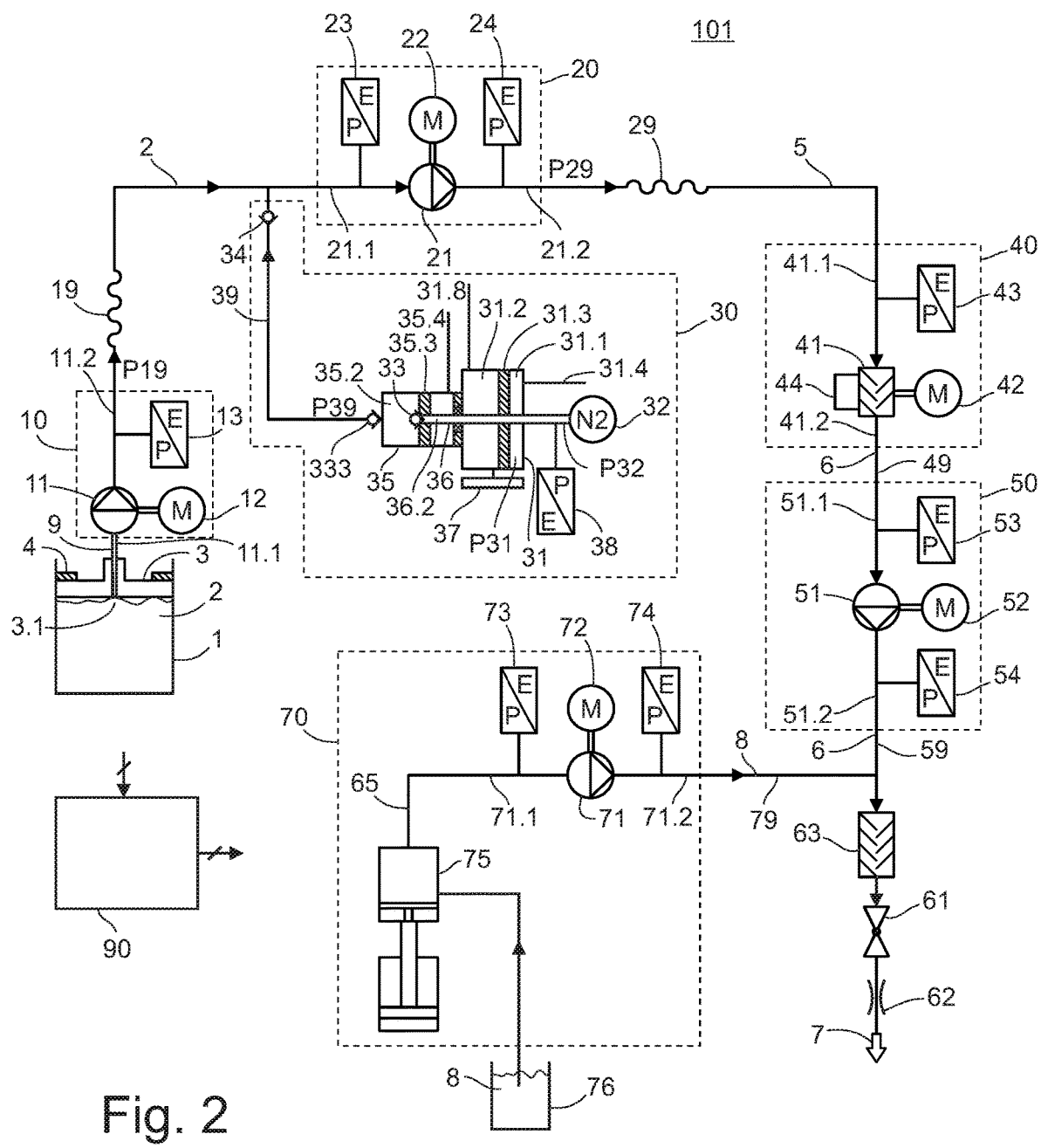
FIG. 2 shows a block diagram of a second possible embodiment of the metering and application system according to the invention.

The second embodiment of the metering and application system 101 illustrated in FIG. 2 differs from the metering and application system 100 by an additional accelerator material assembly 70 and a second mixer 63. The other components of the metering and application system 101 can be embodied and arranged like those of the metering and application system 100.

The accelerator material assembly 70 comprises an accelerator material pump 75, or in short conveyor, for conveying accelerator material 8 from an accelerator material reservoir 76. The accelerator material assembly 70 also comprises a fourth pump 71 and an associated pump drive 72. The fourth pump 71 may be embodied, for example, as a gear pump. By means of the fourth pump 71, the accelerator material 8 can be fed into the line 59. From there, it passes together with the homogeneous gas/polymer material mixture 6 to the second mixer 63. The accelerator material 8 is mixed there with the homogeneous gas/polymer material mixture 6 and transported to the metering valve 61. The mixer 63 may be embodied as a static mixer.

The accelerator material 8 is usually a reaction accelerator, which contains, inter alia, water. It causes a faster curing of the polymer material 2.

A pressure sensor 73 or 74 may be provided in each case at the inlet 71.1 and at the outlet 71.2 of the fourth pump 71, respectively. With the pressure sensor 73, the pressure can be detected at the inlet 71.1, and with the pressure sensor 74, the pressure at the outlet 71.2 can be detected. The pressure readings from the two pressure sensors 73 and 74 can be fed to the controller 90 and processed there. It may be provided, for example, that as soon as the reading of the pressure sensor 73 exceeds a certain upper safety threshold value, the controller 90 intervenes and shuts down the system 101 or issues an alert message. The same applies metas mutandis to the monitoring of the reading originating from the pressure sensor 74.

Figure 6:
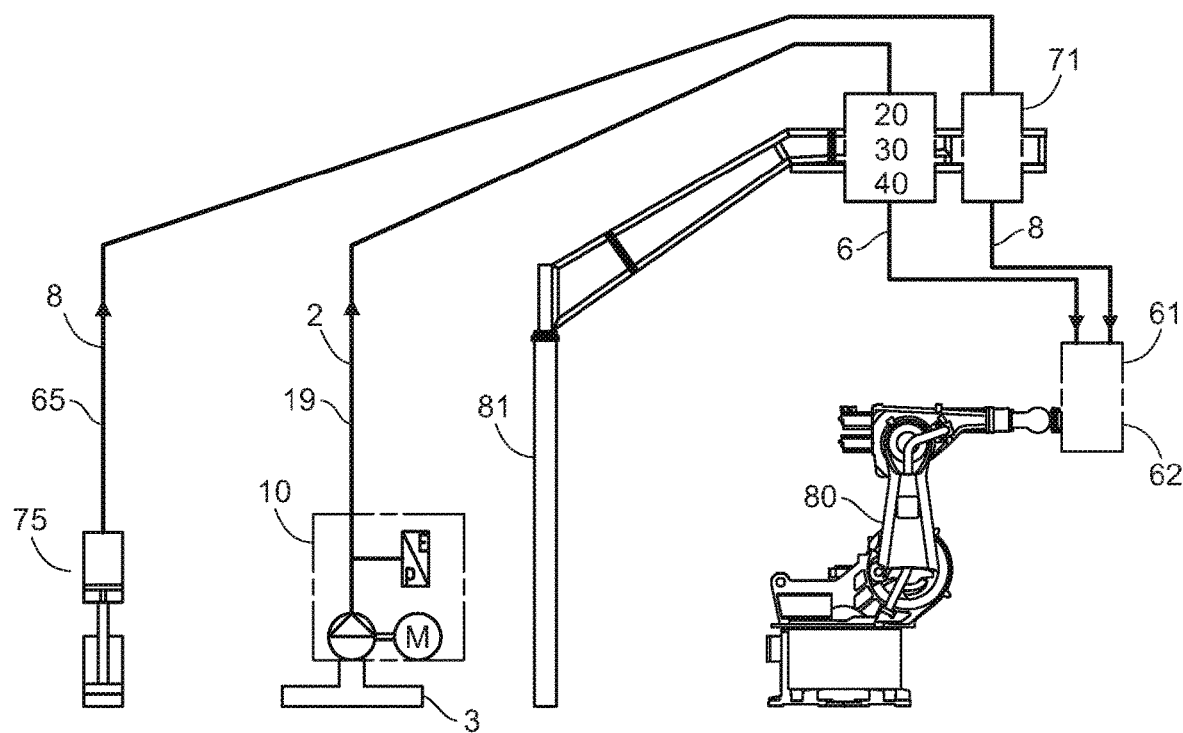
FIG. 6 shows a schematic view of a first possible embodiment of the metering and application system operated with a robot.
Figure 8:
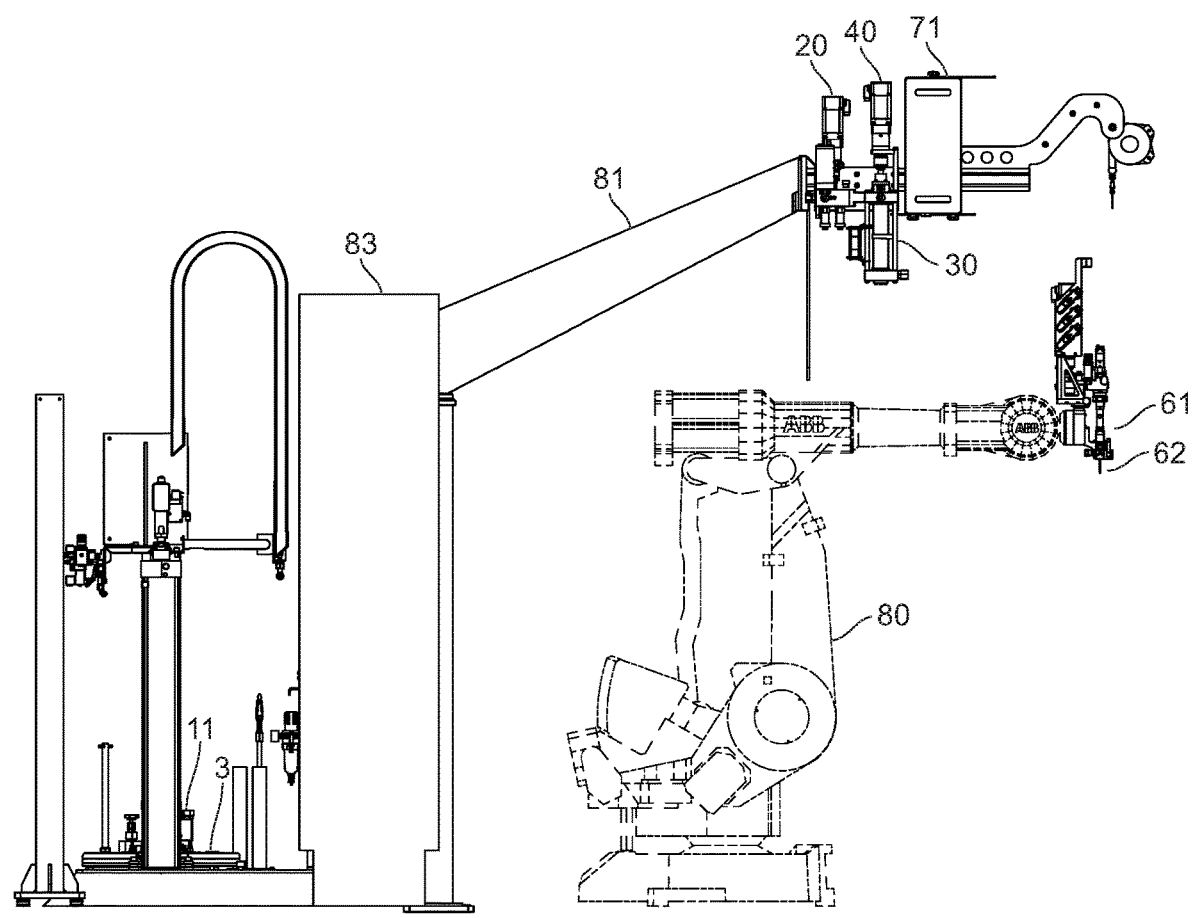
FIG. 8 shows the first embodiment of the metering and application system operated with a robot in a side view.
Figure 9:
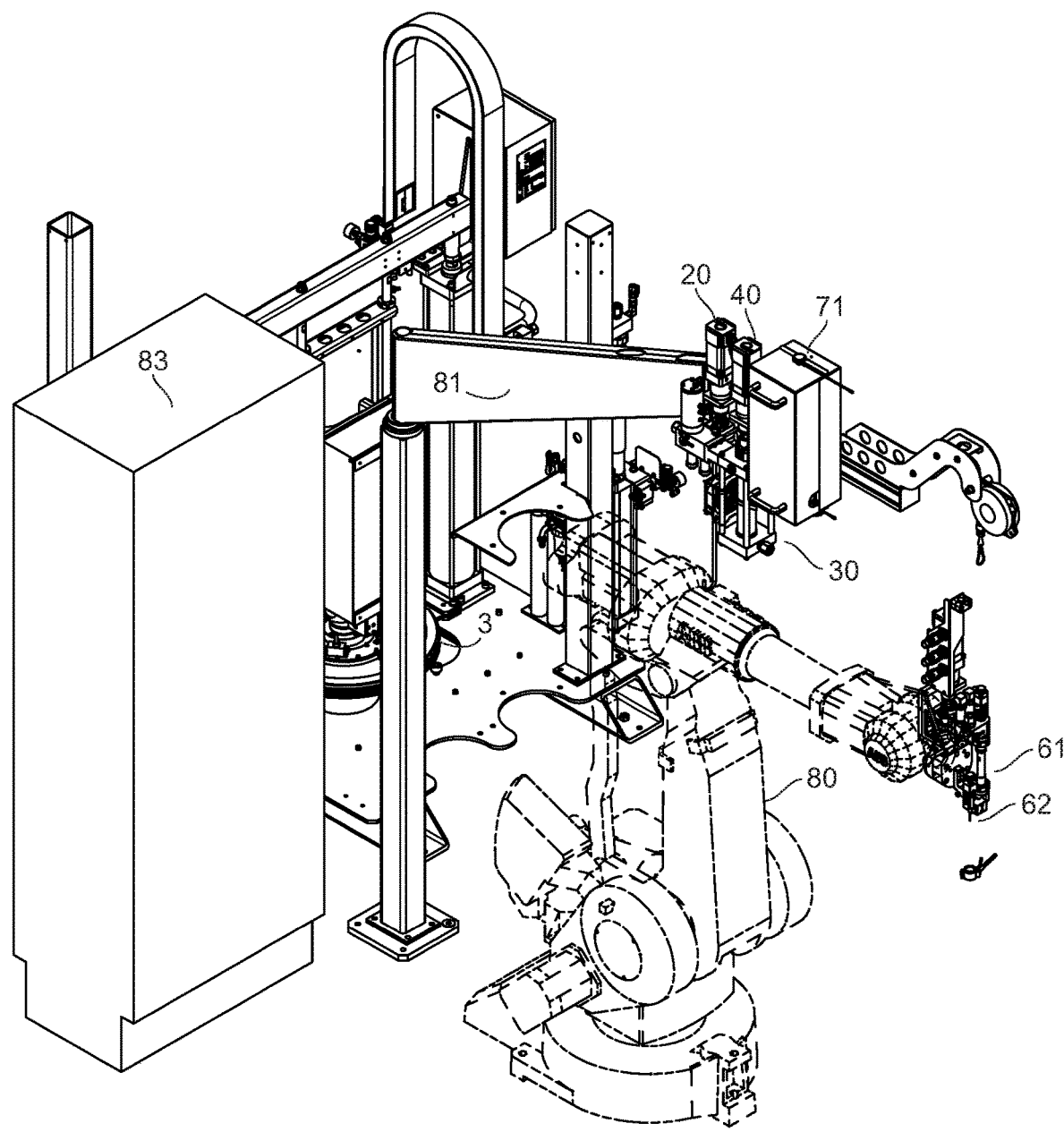
FIG. 9 shows the first embodiment of the metering and application system operated with a robot in a three-dimensional view.

Both the metering and application system 100 and the metering and application system 101 may be part of an automated metering and application system. FIG. 6 shows a schematic view of a first example of such an automated metering and application system. FIG. 8 shows this first embodiment of the automated metering and application system in a side view. FIG. 9 shows the system in a three-dimensional view.

The reservoir 1, the follower plate 3, the first pump assembly 10 and the conveyor 75 for the accelerator material 8 and the accelerator material reservoir 76 of the metering and application system 101 are positioned fixedly on the ground. The second pump assembly 20, the gas metering device 30 and the mixer assembly 40, and the fourth pump 71 of the metering and application system 101 are supported by a swivel arm 81. Only the metering valve 61 and the application nozzle 62 are attached to the arm of a robot 80. In this way, the mass that the robot 80 must manipulate is minimized. Due to the low weight that the robot 80 has to carry, it can be dimensioned in a small way in terms of performance and yet work quickly and accurately.

The controller 90 may be placed in a control cabinet 83. The control cabinet 83 may also include the controller for the robot 80.

Figure 7:
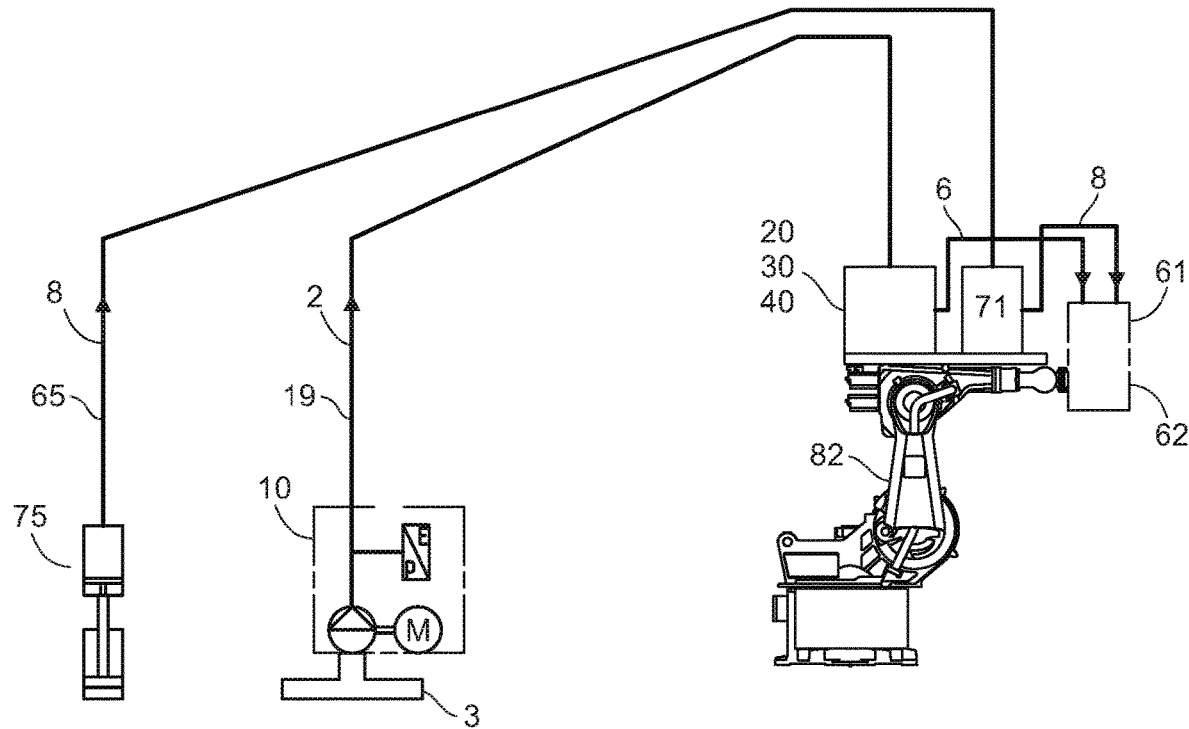
FIG. 7 shows a schematic view of a second possible embodiment of the metering and application system operated with a robot.

FIG. 7 illustrates a schematic view of a second example of an automated metering and application system. In this embodiment, a robot 82 carries the second pump assembly 20, the gas metering device 30 and the mixer assembly 40, as well as the fourth pump 71 of the metering and application equipment 101. The metering valve 61 and the nozzle 62 are attached to the arm of a robot 82. The reservoir 1, the follower plate 3, the first pump assembly 10 and the conveyor 75 for the accelerator material 8 and the accelerator material reservoir 76 of the metering and application system 101 are, as shown in FIG. 6, fixedly positioned on the ground. The swivel arm 81 shown in FIG. 6 can be omitted here, so that no space has to be provided for this purpose.

The foregoing description of the exemplary embodiments of the present invention is for illustrative purposes only. Within the scope of the invention, various changes and modifications are possible. Thus, for example, the various components of the metering and application system shown in FIGS. 1 to 9 can also be combined with one another in a manner different from that shown in the figures.

The invention claimed is:

1. A metering and application system for a moisture-curing polymer material, wherein
a reservoir for the polymer material is provided,
a first pump and a second pump are provided, wherein the polymer material is conveyable with the first pump from the reservoir to the second pump,
a gas metering device is provided with a defined pressure ratio to bring a gas to a defined pressure, wherein the gas metering device is connected to the input of the second pump on its outlet side,
a mixer is provided for mixing the polymer material and the gas, and
a valve arranged downstream of the mixer for metering and a nozzle for applying the polymer material/gas mixture are provided.

2. The metering and application system according to claim 1, wherein the mixer is embodied as a static mixer or as a dynamic mixer or as a combination of a static and a dynamic mixer.

3. The metering and application system according to claim 1, wherein
the gas metering device (has a first chamber with a defined volume and a pressure piston, wherein the pressure piston in the first chamber performs a defined stroke, and
the gas metering device has a second chamber and a piston coupled with the pressure piston, so that the gas located in the second chamber can be set to the defined pressure.

4. The metering and application system according to claim 3, wherein the gas metering device has a position sensor for detecting the stroke of the pressure piston.

5. The metering and application system according to claim 3, wherein
a first check valve is arranged at the gas inlet of the second chamber, and
a second check valve is arranged at the gas outlet of the gas metering device.

6. The metering and application system according to claim 5, wherein the gas metering device has a third check valve arranged in the flow path of the gas between the first check valve and the second check valve.

7. The metering and application system according to claim 1, wherein a first pressure sensor is provided upstream of the second pump in order to detect the pressure in the supply line to the second pump.

8. The metering and application system according to claim 3, wherein a second pressure sensor is provided at the outlet of the second pump in order to detect the pressure at the outlet of the second pump.

9. The metering and application system according to claim 3, wherein the gas metering device has a pressure sensor to detect the pressure in the second chamber.

10. The metering and application system according to claim 1, wherein a pressure sensor is provided at the inlet of the mixer in order to detect the pressure at the inlet of the mixer.

11. The metering and application system according to claim 1, wherein a third pump is provided at the outlet of the mixer to specify the amount of polymer material output.

12. The metering and application system according to claim 11, wherein a pressure sensor is provided at the outlet of the third pump in order to detect the pressure at its outlet.

13. The metering and application system according to claim 1, wherein
the first pump is embodied and operable to keep the pressure at its outlet constant, and
the second pump is embodied and operable to keep the pressure at its outlet constant.

14. The metering and application system according to claim 1, wherein
an accelerator material pump is provided to convey accelerator material to an additional pump,
wherein the additional pump is provided to pump the accelerator material to a second mixer, wherein the second mixer is provided to mix the gas/polymer material mixture with the accelerator material.

15. The metering and application system according to claim 14, wherein a pressure sensor is provided on an inlet side of the additional pump.

16. The metering and application system according to claim 14, wherein a pressure sensor is provided at an outlet of the additional pump in order to detect the pressure at the outlet of the additional pump.

17. The metering and application system according to claim 1, wherein a robot is provided which carries the nozzle.

* * * * *